(12) United States Patent
Kibo

(10) Patent No.: US 11,907,507 B2
(45) Date of Patent: Feb. 20, 2024

(54) CONTROL SPECIFICATION VISUALIZATION PROGRAM AND CONTROL SPECIFICATION VISUALIZATION METHOD

(71) Applicant: DAIKIN INDUSTRIES, LTD., Osaka (JP)

(72) Inventor: Kousuke Kibo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/907,579

(22) PCT Filed: Mar. 18, 2021

(86) PCT No.: PCT/JP2021/011059
§ 371 (c)(1),
(2) Date: Sep. 28, 2022

(87) PCT Pub. No.: WO2021/200210
PCT Pub. Date: Oct. 7, 2021

(65) Prior Publication Data
US 2023/0132334 A1 Apr. 27, 2023

(30) Foreign Application Priority Data

Mar. 31, 2020 (JP) ................ 2020-062592

(51) Int. Cl.
*G06F 3/048* (2013.01)
*G06F 3/0484* (2022.01)
(52) U.S. Cl.
CPC .................. *G06F 3/0484* (2013.01)
(58) Field of Classification Search
CPC ...................................................... G06F 3/048
See application file for complete search history.

(56) References Cited

U.S. PATENT DOCUMENTS 5,612,730 A * 3/1997 Lewis ................ H04N 21/4622
348/E7.071
5,841,656 A 11/1998 Taruishi
(Continued)

FOREIGN PATENT DOCUMENTS

JP H09-073307 3/1997
JP 2002-163003 6/2002
(Continued)

OTHER PUBLICATIONS

Akahoshi et al., A Content and Device Management Method for Multiple Content Browsing with Multiple devices, 2005, IEEE, 4 pages.*

(Continued)

*Primary Examiner* — Linh K Pham
(74) *Attorney, Agent, or Firm* — IPUSA, PLLC

(57) ABSTRACT

The present disclosure provides a control specification visualization program and a control specification visualization method for improving work efficiency when designing a plurality of processes to be executed in controlled devices. The control specification visualization program causes a computer to execute an input process for inputting processing contents of a plurality of processes to be executed in controlled devices, and a visualization process for visualizing a control specification by analyzing the processing contents of the plurality of processes. The visualization process visualizes the control specification by analyzing the processing contents of the plurality of processes based on at least any of operation control modes, a control operation range, input/output items, or meanings/purposes. The operation control modes, the control operation range, the input/output items, and the meanings/purposes are written in the processing contents of the plurality of processes.

9 Claims, 14 Drawing Sheets

(56) References Cited

U.S. PATENT DOCUMENTS

| | | | | |
|---|---|---|---|---|
| 6,563,430 | B1* | 5/2003 | Kemink | H04N 21/42202 |
| | | | | 340/8.1 |
| 7,200,683 | B1* | 4/2007 | Wang | H04L 12/2809 |
| | | | | 709/250 |
| 7,715,325 | B2* | 5/2010 | Lee | H04L 12/2803 |
| | | | | 370/254 |
| 8,122,357 | B2* | 2/2012 | Han | H04L 12/282 |
| | | | | 715/717 |
| 8,458,594 | B2* | 6/2013 | Namai | G05B 19/409 |
| | | | | 715/717 |
| 8,561,147 | B2* | 10/2013 | Lee | H04L 63/0227 |
| | | | | 713/153 |
| 8,782,150 | B2* | 7/2014 | Sugiyama | G06F 9/547 |
| | | | | 709/219 |
| 8,832,602 | B2* | 9/2014 | Lee | G06F 3/0482 |
| | | | | 715/855 |
| 9,055,387 | B1* | 6/2015 | Boyle | H04W 4/60 |
| 9,853,922 | B2* | 12/2017 | Brody | H04L 51/04 |
| 9,898,168 | B2* | 2/2018 | Shapiro | H04L 12/2829 |
| 9,921,728 | B2* | 3/2018 | Shim | G06F 9/451 |
| 11,451,043 | B1* | 9/2022 | Olander | G01R 21/133 |
| 2002/0174270 | A1* | 11/2002 | Stecyk | H04L 12/2805 |
| | | | | 345/169 |
| 2009/0145145 | A1* | 6/2009 | Saruwatari | F24F 11/62 |
| | | | | 62/157 |
| 2009/0319900 | A1* | 12/2009 | Namai | G06F 3/03547 |
| | | | | 340/12.54 |

FOREIGN PATENT DOCUMENTS

| | | | | |
|---|---|---|---|---|
| WO | 2008/096632 | | 8/2008 | |
| WO | WO-2017037891 | A1* | 3/2017 | F25B 47/02 |

OTHER PUBLICATIONS

Kukimmoto et al., Openn government Data Visualiztion System to Facilitate Evidence-Based Debate Using a Large-Scele Interactive Display, 2014, IEEE, 6 pages.*

Li et al, P4: Portable Parallel Processing Pipelines for Interactive Information Visualization, Mar. 2020, IEEE, 14 pages.*

Hennig et al. Sustainable Visualization Solutions in Industrial Automation with Movisa—a Case Study, 2011, IEEE, 6 pages.*

International Search Report for PCT/JP2021/011059 dated May 25, 2021.

International Preliminary Report on Patentability for PCT/JP2021/011059 dated Oct. 13, 2022.

* cited by examiner

FIG.4

401 — PROCESS A
- EXECUTION MODE: COOLING
- COMPRESSOR ROTATIONAL SPEED = 5 × (TARGET LOW-PRESSURE VALUE − LOW-PRESSURE PRESSURE)

PROPERTY
MEANING/PURPOSE LABEL: COMPRESSOR CONTROL

402 — PROCESS B
- EXECUTION MODE: COOLING
- MOTOR-OPERATED VALVE OPENING DEGREE = 400

PROPERTY
MEANING/PURPOSE LABEL: MOTOR-OPERATED VALVE CONTROL

403 — PROCESS C
- EXECUTION MODE: HEATING
  - OUTDOOR TEMPERATURE < 10
    → COMPRESSOR ROTATIONAL SPEED = 80
    MOTOR-OPERATED VALVE OPENING DEGREE = 300
  - OTHER THAN ABOVE
    → COMPRESSOR ROTATIONAL SPEED = 40
    MOTOR-OPERATED VALVE OPENING DEGREE = 150

PROPERTY
MEANING/PURPOSE LABEL: COMPRESSOR CONTROL, MOTOR-OPERATED VALVE CONTROL

404 — PROCESS D
- EXECUTION MODE: COOLING
- TARGET LOW-PRESSURE VALUE = OUTDOOR TEMPERATURE/40,
  WHERE 0.8 ≤ TARGET LOW-PRESSURE VALUE ≤ 1.0

PROPERTY
MEANING/PURPOSE LABEL: COMPRESSOR CONTROL

405 — PROCESS E
- EXECUTION MODE: COOLING

| LOW-PRESSURE PROTECTION VALUE | LOW-PRESSURE STOP VALUE |
|---|---|
| 0.7 | 0.6 |

PROPERTY
MEANING/PURPOSE LABEL: COMPRESSOR CONTROL

| VARIABLE ATTRIBUTE INFORMATION | |
|---|---|
| VARIABLE | ATTRIBUTE |
| OUTDOOR TEMPERATURE | SENSOR VALUE |
| LOW-PRESSURE PRESSURE | SENSOR VALUE |
| COMPRESSOR ROTATIONAL SPEED | ACTUATOR INSTRUCTION VALUE |
| MOTOR-OPERATED VALVE OPENING DEGREE | ACTUATOR INSTRUCTION VALUE |
| TARGET LOW-PRESSURE VALUE | TARGET CONTROL VALUE |
| LOW-PRESSURE PROTECTION VALUE | PROTECTION THRESHOLD |
| LOW-PRESSURE STOP VALUE | STOP THRESHOLD |
| ... | ... |

510

| OPERATION CONTROL MODES LIST |
|---|
| COOLING |
| HEATING |
| ... |

520

CONTROL SPECIFICATION VISUALIZATION PROGRAM AND CONTROL SPECIFICATION VISUALIZATION METHOD

TECHNICAL FIELD

The present disclosure relates to a control specification visualization program and a control specification visualization method.

BACKGROUND ART

In general, when designing a plurality of processes to be executed in controlled devices, a writer writes processing contents for each of the processes while displaying a description frame on a display screen on a per-process basis.

RELATED-ART DOCUMENTS

Patent Documents

Patent Document 1: Japanese Laid-Open Patent Publication No. 2002-163003
Patent Document 2: WO 2008/096632

SUMMARY OF THE INVENTION

Problem to be Solved by the Invention

However, displaying the description frame on a per-process basis is not sufficient for the writer to perform work while grasping the control specification of all of the entire processes, thus resulting in poor work efficiency.

The present disclosure provides a control specification visualization program and a control specification visualization method for improving work efficiency when designing a plurality of processes to be executed in controlled devices.

Means to Solve the Problem

A first aspect of the present disclosure provides a control specification visualization program for causing a computer to execute:
an input process for inputting processing contents of a plurality of processes to be executed in controlled devices; and
a visualization process for visualizing a control specification by analyzing the processing contents of the plurality of processes,
wherein the visualization process visualizes the control specification by analyzing the processing contents of the plurality of processes based on at least any of operation control modes, a control operation range, input/output items, or meanings/purposes, the operation control modes, the control operation range, the input/output items, and the meanings/purposes being written in the processing contents of the plurality of processes.

The first aspect of the present disclosure can provide a control specification visualization program for improving work efficiency when designing a plurality of processes to be executed in controlled devices.

A second aspect of the present disclosure provides the control specification visualization program according to the first aspect, wherein, when the visualization process analyzes the processing contents based on the operation control modes, the visualization process two-dimensionally arranges the operation control modes and variables having a specific attribute so as to visualize, for each of the operation control modes, processes by which the variables having the specific attribute are calculated, the operation control modes being selectable for each of the processes.

A third aspect of the present disclosure provides the control specification visualization program according to the second aspect, wherein, when a process, by which a variable having the specific attribute is calculated, is selected and an access instruction is input, the visualization process displays processing contents of the selected process.

A fourth aspect of the present disclosure provides the control specification visualization program according to the first aspect, wherein, when the visualization process analyzes the processing contents based on the control operation range, the visualization process visualizes the control operation range by arranging values relating to the control operation range on a Mollier diagram.

A fifth aspect of the present disclosure provides the control specification visualization program according to the first aspect, wherein, when the visualization process analyzes the processing contents based on the input/output items, the visualization process visualizes an execution order of the plurality of processes by arranging the plurality of processes in the execution order.

A sixth aspect of the present disclosure provides the control specification visualization program according to the first aspect, wherein, when the visualization process analyzes the processing contents based on the meanings/purposes, the visualization process classifies and displays the processes based on meaning/purpose labels so as to visualize a process for each of the meaning/purpose labels, each of the processes including the meaning/purpose label.

A seventh aspect of the present disclosure provides the control specification visualization program according to the sixth aspect, wherein, when a meaning/purpose label is selected and an access instruction is input, the visualization process displays processing contents of a process in which the selected meaning/purpose label is set.

An eighth aspect of the present disclosure provides a control specification visualization program for causing a computer to execute:
a display process for displaying a screen for visualizing a control specification based on processing contents of a plurality of processes to be executed in controlled devices,
wherein the display process displays at least one of
a screen for indicating processes for each operation control mode,
a screen for displaying a control operation range on a Mollier diagram,
a screen for indicating an execution order of processes, or
a screen for classifying and displaying processes based on meanings/purposes.

The eighth aspect of the present disclosure can provide a control specification visualization program for improving work efficiency when designing a plurality of processes to be executed in controlled devices.

A ninth aspect of the present disclosure provides a control specification visualization method including:
an input process for inputting processing contents of a plurality of processes to be executed in controlled devices; and visualization process for visualizing a control specification by analyzing the processing contents of the plurality of processes, wherein the visualization process visualizes the control specification by analyzing the processing contents of the plurality of processes based on at least any of operation control modes, a control operation range, input/output items, or meanings/purposes, the operation control modes, the control operation range, the input/output items, and the meanings/purposes being written in the processing contents of the plurality of processes.

The ninth aspect of the present disclosure can provide a control specification visualization method for improving work efficiency when designing a plurality of processes to be executed in controlled devices.

A tenth aspect of the present disclosure provides a control specification visualization method including:

a display process for displaying a screen for visualizing a control specification based on processing contents of a plurality of processes to be executed in controlled devices, wherein the display process displays at least one of
- a screen for indicating processes for each operation control mode,
- a screen for displaying a control operation range on a Mollier diagram,
- a screen for indicating an execution order of processes, or
- a screen for classifying and displaying processes based on meanings/purposes.

The tenth aspect of the present disclosure can provide a control specification visualization method for improving work efficiency when designing a plurality of processes to be executed in controlled devices.

BRIEF DESCRIPTION OF THE DRAWINGS

FIG. 4 is a first diagram illustrating a specific example of a process performed by the description unit;

FIG. 5 is a second diagram illustrating a specific example of the process performed by the description unit;

MODE FOR CARRYING OUT THE INVENTION

In the following, embodiments will be described with reference to the accompanying drawings. In the specification and drawings, elements having substantially the same functions or configurations are referred to by the same numerals and the description thereof will not be repeated.

First Embodiment

Usage Scenario of Design Work Support Apparatus

Figure 1:
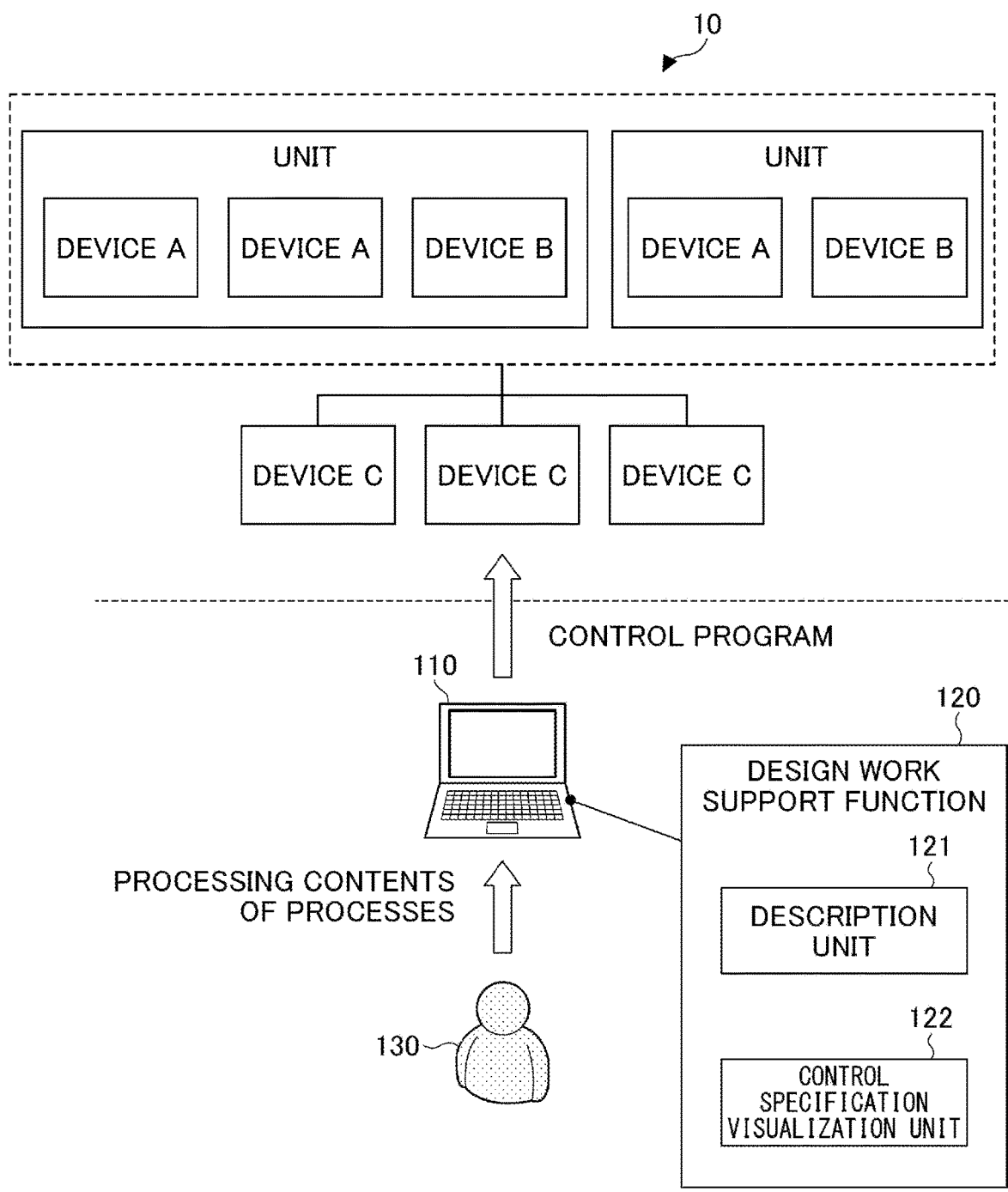
FIG. 1 is a diagram illustrating an example of a usage scenario of a design work support apparatus.

First, a usage scenario of a design work support apparatus when designing a plurality of processes to be executed in controlled devices will be described. FIG. 1 is a diagram illustrating an example of a usage scenario of a design work support apparatus. As illustrated in FIG. 1, for example, a design work support apparatus 110 provides a device system 10 with a control program for a plurality of processes to be executed in controlled devices included in the device system 10.

In FIG. 1, the device system 10 includes a plurality of units. In each of the units, a plurality of types of devices (device(s) A and device(s) B) operate in cooperation with other devices (devices C) located outside the units. However, the system configuration of the device system 10, to which the control program is provided by the design work support apparatus 110, may be any configuration, and is not limited to the configuration illustrated in the example of FIG. 1.

A design work support program is installed in the design work support apparatus 110, and the design work support apparatus 110 implements a design work support function 120 by executing the design work support program.

The design work support program includes subprograms (for example, a description program and a control specification visualization program) for implementing a plurality of subfunctions. When the design work support program is executed, the subprograms are also executed. That is, the plurality of subfunctions of the design work support function 120 include at least a description unit 121 and a control specification visualization unit 122.

The description unit 121 is a functional unit that performs an input process for inputting processing contents of a plurality of processes to be executed in controlled devices. Specifically, the description unit 121 provides description frames in which processing contents of a plurality of processes to be executed in controlled devices (devices A to C in the example of FIG. 1) are written. Further, when a user 130 has written processing contents of a process in a description frame, the description unit 121 receives the processing contents. As used herein, the "process" refers to a set of processing contents written in the description frame by the user 130.

The control specification visualization unit 122 is a functional unit that performs a visualization process for visualizing a control specification by analyzing processing contents of a plurality of processes (or performs a display process for displaying a screen for visualizing a control specification). Specifically, the control specification visualization unit 122 extracts various information and displays (visualizes) the extracted information on display screens by analyzing processing contents of a plurality of processes, written by the user 130, on a cross-process basis. Therefore, the control specification visualization unit 122 can display the processing contents of the plurality of processes for the user 130 in various manners. Accordingly, the user 130 can write processing contents of a plurality of processes while grasping the control specification of all of the processes.

Further, when the user 130 has input an access instruction for specific information from among visualized information, the control specification visualization unit 122 accesses a process corresponding to the specific information, and displays processing contents of the process. In this manner, the user 130 can smoothly access the process corresponding to the specific information.

Accordingly, the control specification visualization unit 122 can improve work efficiency when designing a plurality of processes to be executed in controlled devices.

Hardware Configuration of Design Work Support Apparatus

Figure 2:
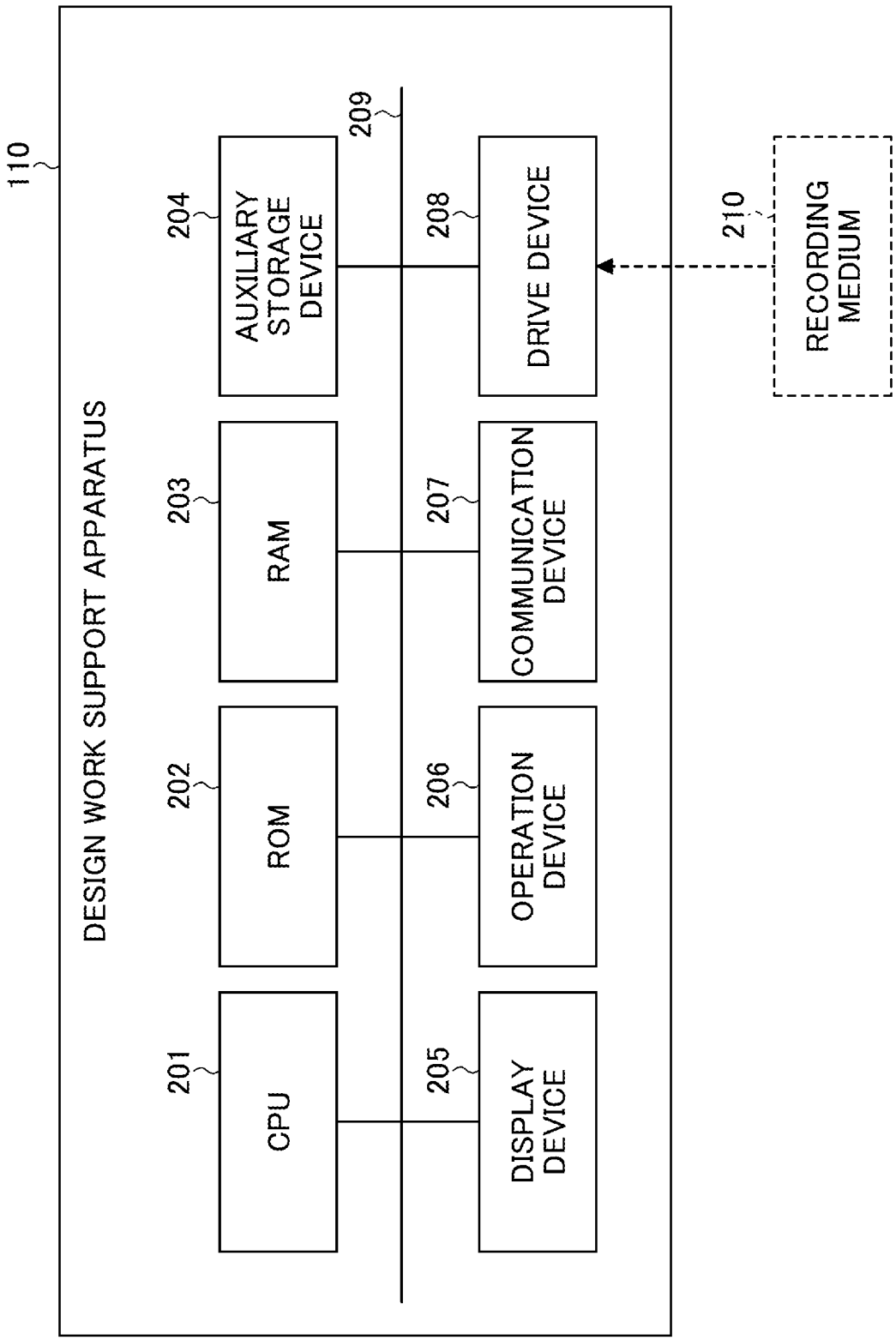
FIG. 2 is a diagram illustrating an example of a hardware configuration of the design work support apparatus.

Next, a hardware configuration of the design work support apparatus 110 will be described. FIG. 2 is a diagram illustrating an example of a hardware configuration of the design work support apparatus.

As illustrated in FIG. 2, the design work support apparatus 110 includes a central processing unit (CPU) 201, a read-only memory (ROM) 202, and a random-access memory (RAM) 203. The CPU 201, the ROM 202, and the RAM 203 constitute what is known as a computer.

Further, the design work support apparatus 110 includes an auxiliary storage device 204, a display device 205, an operation device 206, a communication device 207, and a drive device 208. Note that the hardware components of the design work support apparatus 110 are connected with one another via a bus 209.

The CPU 201 is a calculation device that executes various programs (for example, the design work support program and the like) installed in the auxiliary storage device 204.

The ROM 202 is a non-volatile memory. The ROM 202 functions as a main storage device that stores various programs, data, and the like necessary for the CPU 201 to execute various programs installed in the auxiliary storage device 204. Specifically, the ROM 202 functions as a main storage device that stores a boot program or the like, such as a basic input/output system (BIOS) or an extensible firmware interface (EFI).

The RAM 203 is a volatile memory such as a dynamic random-access memory (DRAM) or a static random-access memory (SRAM). The RAM 203 functions as a main storage device that provides a work area in which various programs installed in the auxiliary storage device 204 are loaded when executed by the CPU 201.

The auxiliary storage device 204 is an auxiliary storage device that stores various programs and data used when the various programs are executed.

The display device 205 is a display device that displays various display screens. The operation device 206 is an input device used when the user 130 of the design work support apparatus 110 inputs various instructions into the design work support apparatus 110.

The communication device 207 is a communication device that is connected to a network (not illustrated) and performs communication.

The drive device 208 is a device in which a recording medium 210 is set. The recording medium 210 includes a medium for optically, electrically, or magnetically recording information, such as a CD-ROM, a flexible disk, or a magneto-optical disc. Further, the recording medium 210 may include a semiconductor memory or the like that electrically records information, such as a ROM, a flash memory, or the like.

Various programs to be installed in the auxiliary storage device 204 are installed by, for example, setting the distributed recording medium 210 in the drive device 208 and reading the various programs recorded in the recording medium 210 by the drive device 208. Alternatively, various programs to be installed in the auxiliary storage device 204 may be installed by being downloaded from the network via the communication device 207.

Figure 3:
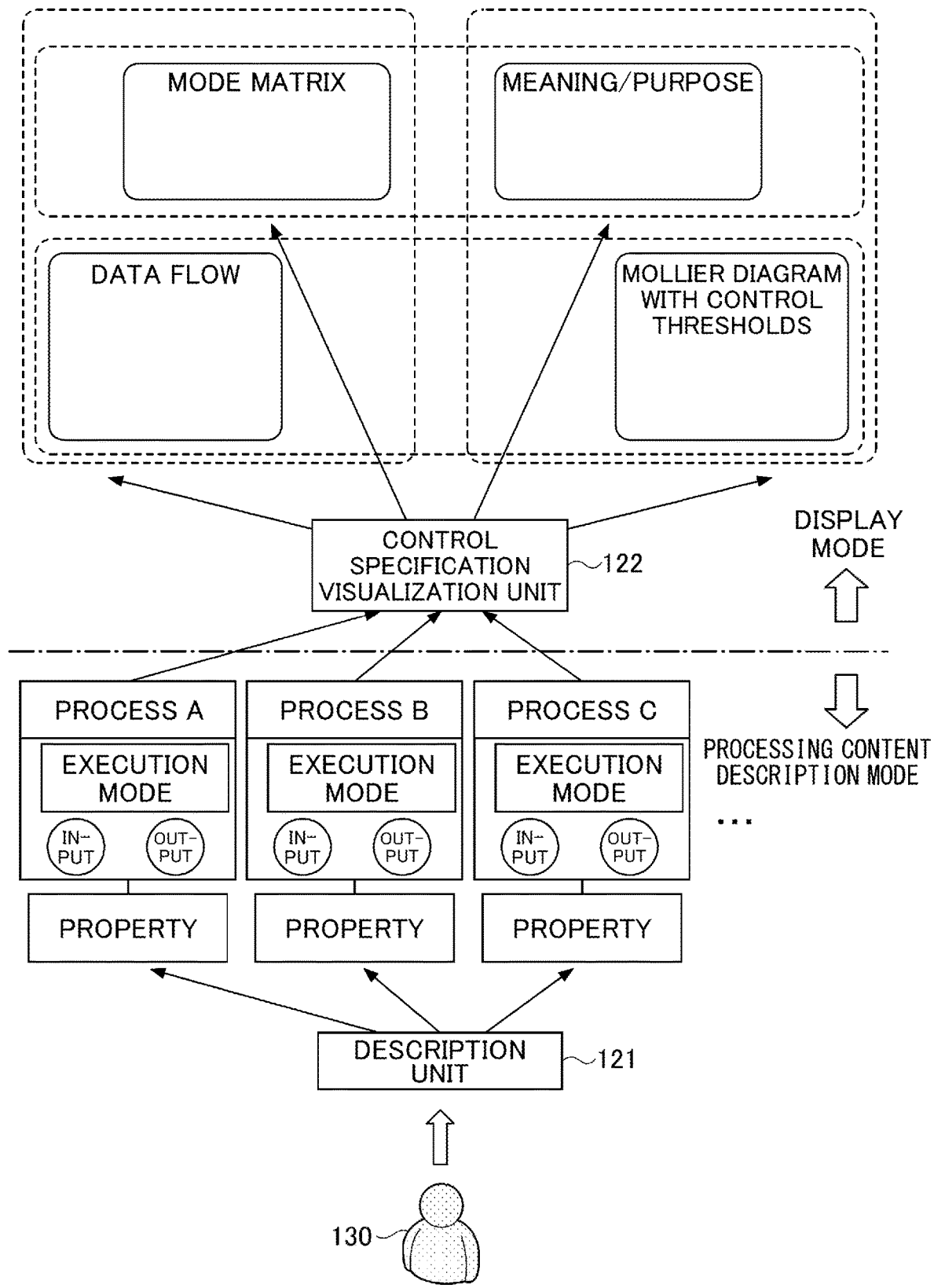
FIG. 3 is a diagram illustrating an outline of processes performed by a description unit and a control specification visualization unit.

Outline of Processes Performed by Description Unit and Control Specification Visualization Unit Next, an outline of processes performed by the description unit 121 and the control specification visualization unit 122 will be described. FIG. 3 is a diagram illustrating an outline of processes performed by the description unit and the control specification visualization unit. In the following description, the device system 10 is an air conditioning system, the devices A are compressors, the devices B are heat exchangers, and the devices C are indoor units.

As described above, the description unit 121 receives processing contents of a plurality of processes written in the description frames by the user 130. As illustrated in FIG. 3, for example, the processing contents of the plurality of processes received by the description unit 121 include:
execution modes in which the processes are executed from among a plurality of predetermined operation control modes;
an input item of each of the processes (a variable to be input into each of the processes, hereinafter referred to as an input variable) and an output item of each of the processes (a variable to be output from of each of the processes, hereinafter referred to as an output variable); and
a property (an attribute of each of the processes) in which a meaning/purpose label indicating the meaning or purpose of each of the processes is set.

The description unit 121 performs the input process in processing content description mode, and in response to receiving a transition instruction from the user 130 and transitioning to a display mode, the design work support apparatus 110 starts the control specification visualization unit 122 and the control specification visualization unit 122 performs the visualization process in display mode.

As described above, the control specification visualization unit 122 extracts various information and displays (visualizes) the extracted information on display screens by analyzing processing contents of a plurality of processes, written by the user 130, on a cross-process basis. As illustrated in FIG. 3, for example, the display screens displayed by the control specification visualization unit 122 include:
a mode matrix display screen;
a meaning/purpose display screen;
a data flow display screen; and
a Mollier diagram and control threshold display screen.

The mode matrix display screen is a display screen for two-dimensionally arranging operation control modes and variables having a specific attribute so as to display, for each of the operation control modes and for each of the variables, processes by which the variables having the specific attribute are calculated. The operation control modes are selectable for each of the processes. The mode matrix display screen visualizes the control specification by displaying by which process a variable having a specific attribute is calculated, or by displaying in which operation control mode the process, by which the variable having the specific attribute is calculated, is executed.

The meaning/purpose display screen is a display screen for classifying and displaying a plurality of processes based on meaning/purpose labels set in properties of the plurality of processes. The meaning/purpose display screen visualizes the control specification by displaying which process is executed under each meaning/purpose label or by displaying under which meaning/purpose label each process is executed.

The data flow display screen is a display screen for arranging and displaying a plurality of processes in the execution order determined based on input/output items (input/output variables) of the plurality of processes. The data flow display screen visualizes the control specification by displaying in what order the plurality of processes are executed.

The Mollier diagram and control threshold display screen is a display screen for collectively displaying, on a Mollier diagram (a diagram indicating the state of a refrigerant), a plurality of types of values relating to a control operation range, which are separately written in a plurality of processes. The Mollier diagram and control threshold display screen visualizes the control specification by displaying in what control operation range controlled devices are operated.

Specific Example of Process Performed by Description Unit

Next, a specific example of a process performed by the description unit 121 will be described. FIG. 4 is a first diagram illustrating a specific example of a process performed by the description unit. As illustrated in FIG. 4, the description unit 121 receives processing contents of a plurality of processes (for example, a plurality of processes 401, 402, 403, 404, 405, and the like) written by the user 130.

In FIG. 4, the process 401 indicates that:
the process name is "process A", and the process 401 is executed in "cooling" mode (operation control mode);
the compressor rotational speed is calculated based on a target low-pressure value and low-pressure pressure; and
"compressor control" is set as a meaning/purpose label in a property.

Further, in FIG. 4, the process 402 indicates that:
the process name is "process B", and the process 402 is executed in "cooling" mode (operation control mode);
a predetermined value is set for a motor-operated valve opening degree; and
"motor-operated valve control" is set as a meaning/purpose label in a property.

Further, in FIG. 4, the process 403 indicates that:
the process name is "process C", and the process 403 is executed in "heating" mode (operation control mode);
the compressor rotational speed and the motor-operated valve opening degree are changed based on outdoor temperature conditions; and
"compressor control" and "motor-operated valve control" are set as a meaning/purpose label in a property.

Further, in FIG. 4, the process 404 indicates that:
the process name is "process D", and the process 404 is executed in "cooling" mode (operation control mode);
a target low-pressure value is calculated within a predetermined range based on the outdoor temperature; and
"compressor control" is set as a meaning/purpose label in a property.

Further, in FIG. 4, the process 405 indicates that:
the process name is "process E", and the process 405 is executed in "cooling" mode (operation control mode);
respective predetermined values are set for a low-pressure protection value and a low-pressure stop value; and
"compressor control" is set as a meaning/purpose label in a property.

FIG. 5 is a second diagram illustrating a specific example of the process performed by the description unit. As illustrated in FIG. 5, when the user 130 has written variable attribute information in the processing contents of the plurality of processes, and operation control modes included in the device system 10 in which the plurality of processes are executed, the description unit 121 receives the variable attribute information and the operation control mode.

Variable attribute information 510 of FIG. 5 indicates that, from among variables written in the processing contents of the plurality of processes,
variables "outdoor temperature" and "low-pressure pressure" have an attribute of "sensor value";
variables "compressor rotational speed" and "motor-operated valve opening degree" have an attribute of "actuator instruction value";
variable "target low-pressure value" has an attribute of "target control value";
variable "low-pressure protection value" has an attribute of "protection threshold"; and
variable "low-pressure stop value" has an attribute of "stop threshold".

Further, operation control modes list 520 of FIG. 5 indicates that, as operation control modes that are selectable for each of the processes,
the "cooling" mode, and
the "heating" mode are included in the device system 10 in which the plurality of processes are executed.

Figure 6:
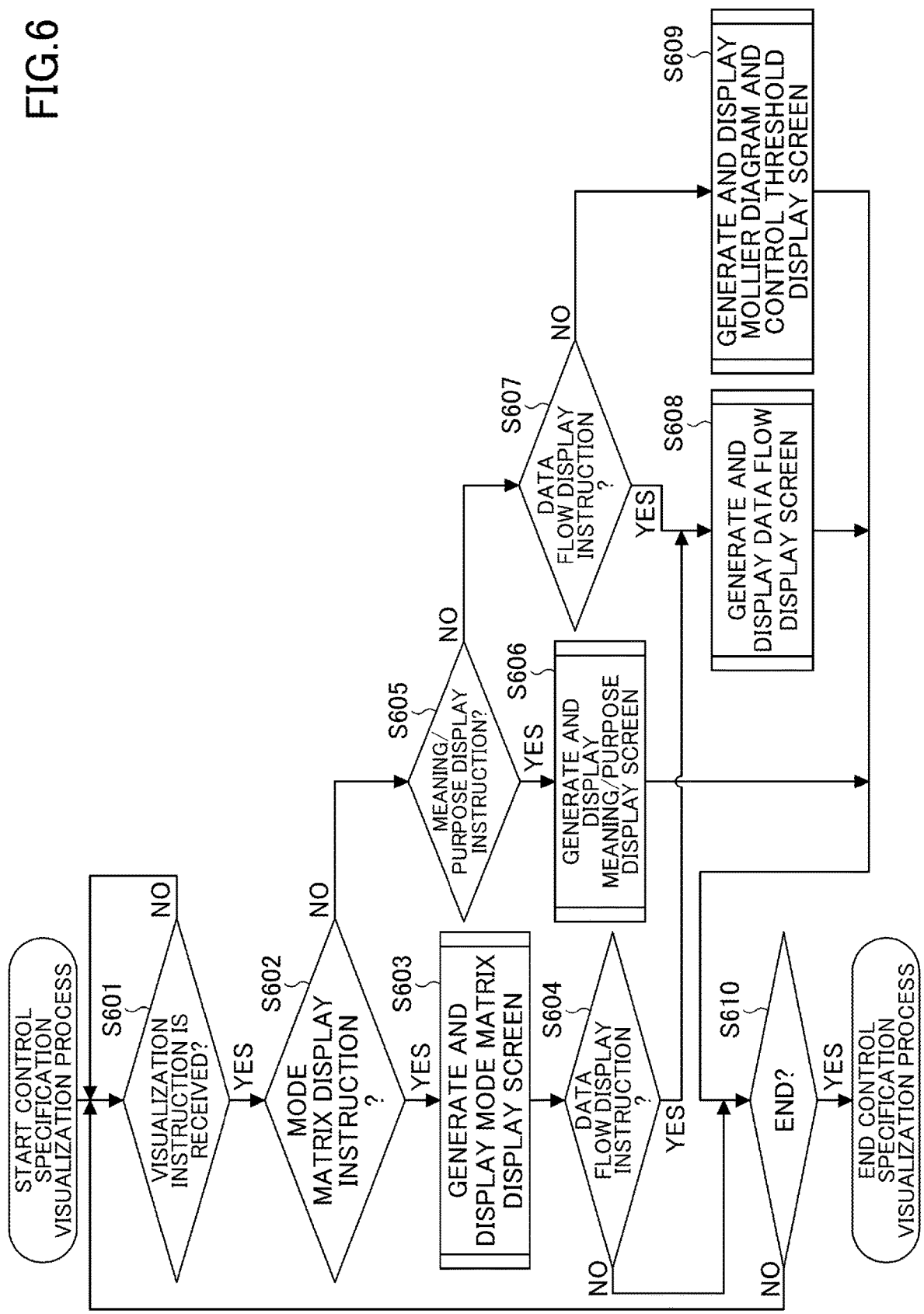
FIG. 6 is a flowchart illustrating a flow of a control specification visualization process performed by the control specification visualization unit.

Flow of Control Specification Visualization Process Performed by Control Specification Visualization Unit Next, a flow of a control specification visualization process, which is an example of a visualization process, performed by the control specification visualization unit 122 will be described. FIG. 6 is a flowchart illustrating a flow of a control specification visualization process performed by the control specification visualization unit. After the processing contents (see FIG. 4 and FIG. 5) of the plurality of processes written by the user 130 are received by the description unit 121, the design work support apparatus 110 transitions to the display mode in response to receiving a transition instruction, and the control specification visualization unit 122 performs the control specification visualization process illustrated in FIG. 6.

In step S601, the control specification visualization unit 122 determines whether a visualization instruction is received from the user 130. In step S601, if the control specification visualization unit 122 determines that a visualization instruction is not received (NO in step S601), the control specification visualization unit 122 waits until a visualization instruction is received.

Conversely, in step S601, if the control specification visualization unit 122 determines that a visualization instruction is received (YES in step S601), the control specification visualization process proceeds to step S602.

In step S602, the control specification visualization unit 122 determines whether the received visualization instruction is a mode matrix display instruction. If the control specification visualization unit 122 determines that the received visualization instruction is a mode matrix display instruction in step S602 (YES in step S602), the control specification visualization process proceeds to step S603.

In step S603, the control specification visualization unit 122 performs a process for generating and displaying a mode matrix display screen. The process for generating and displaying a mode matrix display screen will be described later in detail.

In step S604, the control specification visualization unit 122 further determines whether a data flow display instruction is received as a visualization instruction. If the control specification visualization unit 122 determines that a data flow display instruction is not received in step S604 (No in step S604), the control specification visualization process proceeds to step S610.

Conversely, in step S604, if the data flow display instruction determines that a data flow display instruction is received in step S604 (YES in step S604), the process proceeds to step S608.

Conversely, in step S602, if the control specification visualization unit 122 determines that the received visualization instruction is not a mode matrix display instruction (NO in step S602), the control specification visualization process proceeds to step S605.

In step S605, the control specification visualization unit 122 determines whether the received visualization instruction is a meaning/purpose display instruction. In step S605, if the control specification visualization unit 122 determines that the received visualization instruction is a meaning/purpose display instruction (YES in step S605), the control specification visualization process proceeds to step S606.

In step S606, the control specification visualization unit 122 performs a process for generating and displaying a meaning/purpose display screen, and causes the control specification visualization process to proceed to step S610. The process for generating and displaying a meaning/purpose display screen will be described later in detail.

In step S605, if the control specification visualization unit 122 determines that the received visualization instruction is not a meaning/purpose display instruction (NO in step S605), the control specification visualization process proceeds to step S607.

In step S607, the control specification visualization unit 122 determines whether the received visualization instruction is a data flow display instruction. In step S607, if the control specification visualization unit 122 determines that the received visualization instruction is a data flow display instruction (YES in step S607), the control specification visualization process proceeds to step S608.

In step S608, the control specification visualization unit 122 performs a process for generating and displaying a data flow display screen, and causes the control specification visualization process to proceed to step S610. The process for generating and displaying a data flow display screen will be described later in detail.

Conversely, in step S607, if the control specification visualization unit 122 determines that the received visualization instruction is not a data flow display instruction (NO in step S607), the control specification visualization process proceeds to step S609.

In step S609, the control specification visualization unit 122 performs a process for generating and displaying a Mollier diagram and control threshold display screen, and causes the control specification visualization process to proceed to step S610. The process for generating and displaying a display screen for a Mollier diagram and control threshold display screen will be described later in detail.

In step S610, the control specification visualization unit 122 determines whether to end the control specification visualization process. In step S610, if the control specification visualization unit 122 determines to continue the control specification visualization process (NO in step S610), the control specification visualization process returns to step S601.

Conversely, in step S610, if the control specification visualization unit 122 determines to end the control specification visualization process (YES in step S610), the control specification visualization process ends.

Details of Process for Generating and Displaying Mode Matrix Display Screen

Figure 7:
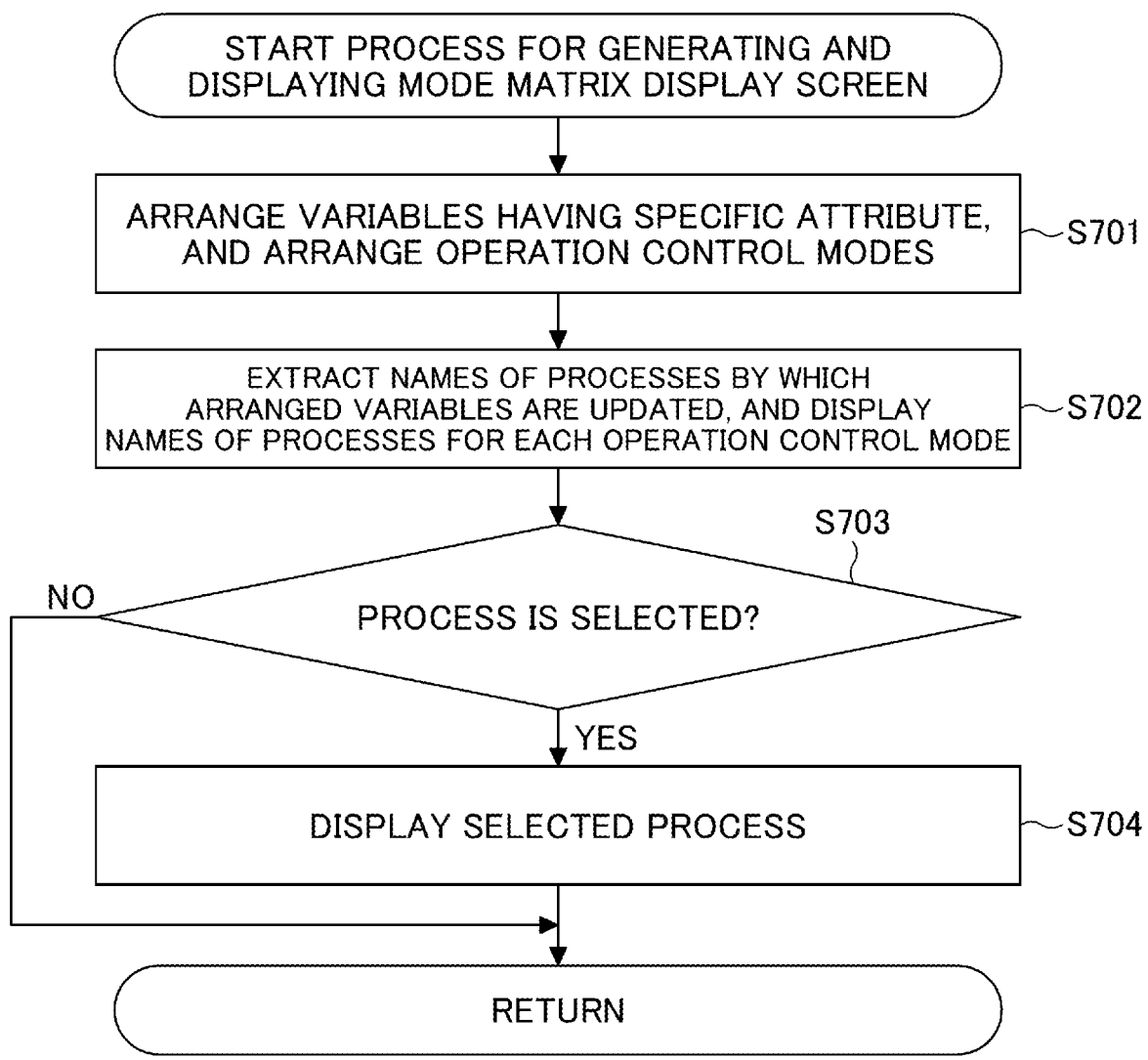
FIG. 7 is a flowchart illustrating a flow of a process for generating and displaying a mode matrix display screen.
Figure 8:
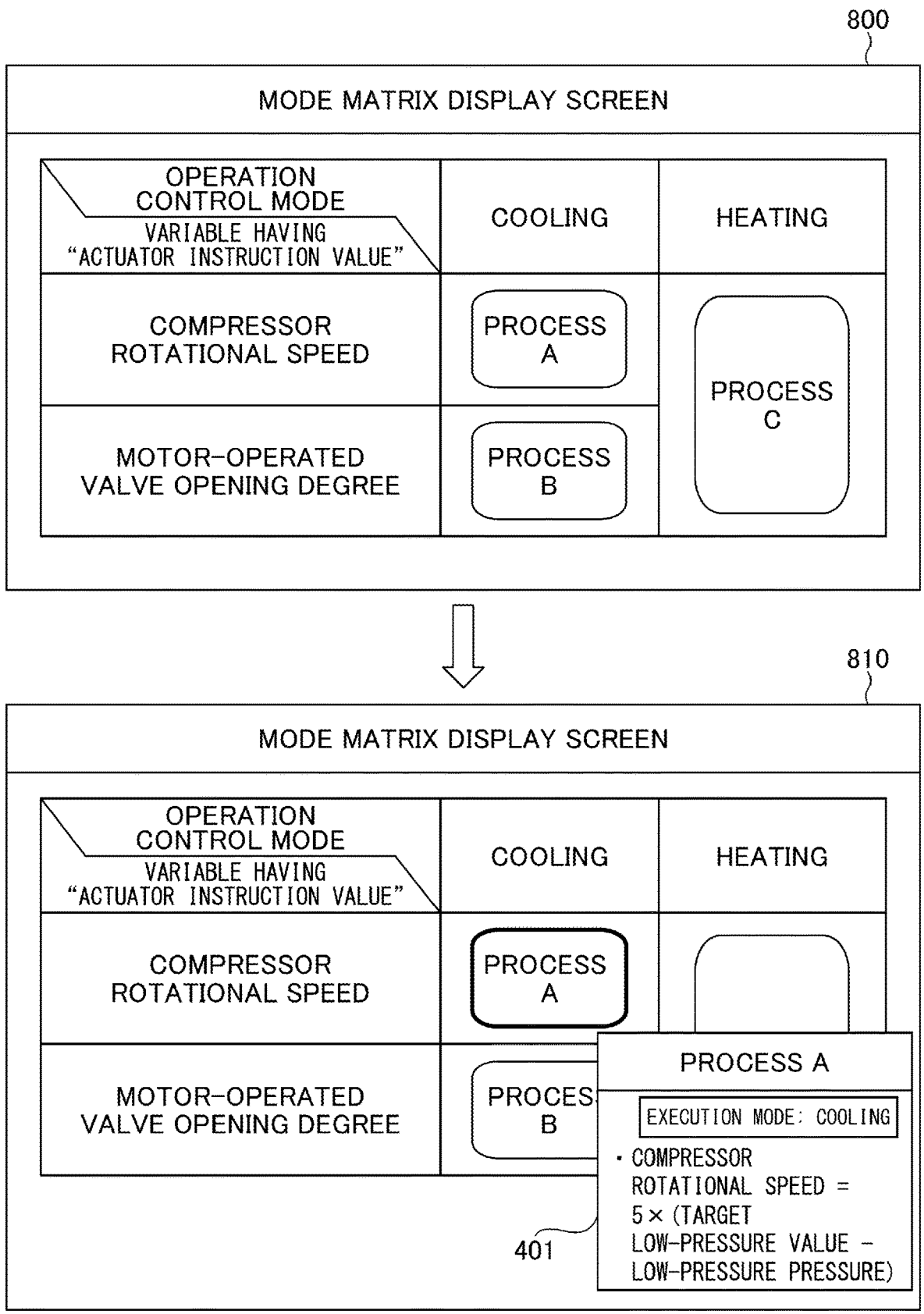
FIG. 8 is a diagram illustrating an example of a mode matrix display screen.

Next, details of the process for generating and displaying a mode matrix display screen will be described with reference to FIG. 7 and FIG. 8. FIG. 7 is a flowchart illustrating a flow of the process for generating and displaying a mode matrix display screen. FIG. 8 is a diagram illustrating an example of a mode matrix display screen. In the following, the process for generating and displaying a mode matrix display screen will be described in detail in accordance with the flowchart of FIG. 7 and with reference to FIG. 8.

In step S701, the control specification visualization unit 122 arranges variables having a specific attribute specified by the user 130. A mode matrix display screen 800 of FIG. 8 indicates that the attribute "actuator instruction value" is specified by the user 130 as a specific attribute, and the variables "compressor rotational speed" and "motor-operated valve opening degree" (see FIG. 5) having the attribute "actuator instruction value" are arranged in the vertical direction.

Further, the control specification visualization unit 122 arranges the operation control modes included in the device system 10. The mode matrix display screen 800 of FIG. 8 indicates that "cooling" and "heating" (see FIG. 5) are arranged in the horizontal direction as the operation control modes that are selectable for each of the processes.

In step S702, from among the plurality of processes 401, 402, 403, 404, 405, and the like, the control specification visualization unit 122 extracts the names of processes by which the variables arranged in step S701 are updated.

Further, the control specification visualization unit 122 identifies execution modes in which the extracted processes are executed, and arranges the names of the extracted processes at positions corresponding to the identified execution modes on the mode matrix display screen 800.

The mode matrix display screen 800 of FIG. 8 indicates that the process 401 ("process A") and the process 403 ("process C"), by which the variable "compressor rotational speed" is updated, are extracted from among the plurality of processes 401, 402, 403, 404, 405, and the like.

Further, the mode matrix display screen 800 of FIG. 8 indicates that the "cooling" mode is identified as an execution mode in which the extracted process 401 is executed, and the "process A", which is the process name of the process 401, is arranged at a position corresponding to the "cooling" mode.

Similarly, the mode matrix display screen 800 of FIG. 8 indicates that the "heating" mode is identified as an execution mode in which the extracted process 403 is executed, and the "process C", which is the process name of the process 403, is arranged at a position corresponding to the "heating" mode.

Further, the mode matrix display screen 800 of FIG. 8 indicates that the process 402 ("process B") and the process 403 ("process C"), by which the variable "motor-operated valve opening degree" is updated, are extracted from among the plurality of processes 401, 402, 403, 404, 405, and the like.

Further, the mode matrix display screen 800 of FIG. 8 indicates that the "cooling" mode is identified as an execution mode in which the extracted process 402 is executed, and the "process B", which is the process name of the process 402, is arranged at a position corresponding to the "cooling" mode.

Further, the mode matrix display screen 800 of FIG. 8 indicates that the "heating" mode is identified as an execution mode in which the extracted process 403 is executed, and the "process C", which is the process name of the process 403, is arranged at a position corresponding to the "heating" mode.

Accordingly, in the process for generating and displaying a mode matrix display screen, by specifying the attribute "actuator instruction value", the user 130 can readily recognize, via the mode matrix display screen 800, by which processes the variables "compressor rotational speed" and "motor-operated valve opening degree" having the attribute "actuator instruction value" are output; and in what operation control modes the variables are output.

In step S703, the control specification visualization unit 122 determines whether a specific process is selected on the mode matrix display screen 800 and whether an access instruction is input. In step S703, if the control specification visualization unit 122 determines that a specific process is selected and an access instruction is input (YES in step S703), the process proceeds to step S704.

In step S704, the control specification visualization unit 122 displays processing contents of the selected process.

A mode matrix display screen 810 of FIG. 8 indicates that processing contents of the process 401 are displayed in response to the process 401 having the process name "process A" being selected and the access instruction being input.

Accordingly, the user 130 can use the mode matrix display screen to smoothly access a process by which a variable having a specific attribute is output in a specific operation control mode. As a result, the user 130 can readily check how the variable having the specific attribute is calculated by the process in the specific operation control mode.

For example, the user 130 can readily check how the compressor rotational speed is calculated in "cooling" mode by selecting the "process A" on the mode matrix display screen 810 and inputting the access instruction.

Details of Process for Generating and Displaying Meaning/purpose Display Screen

Figure 9:
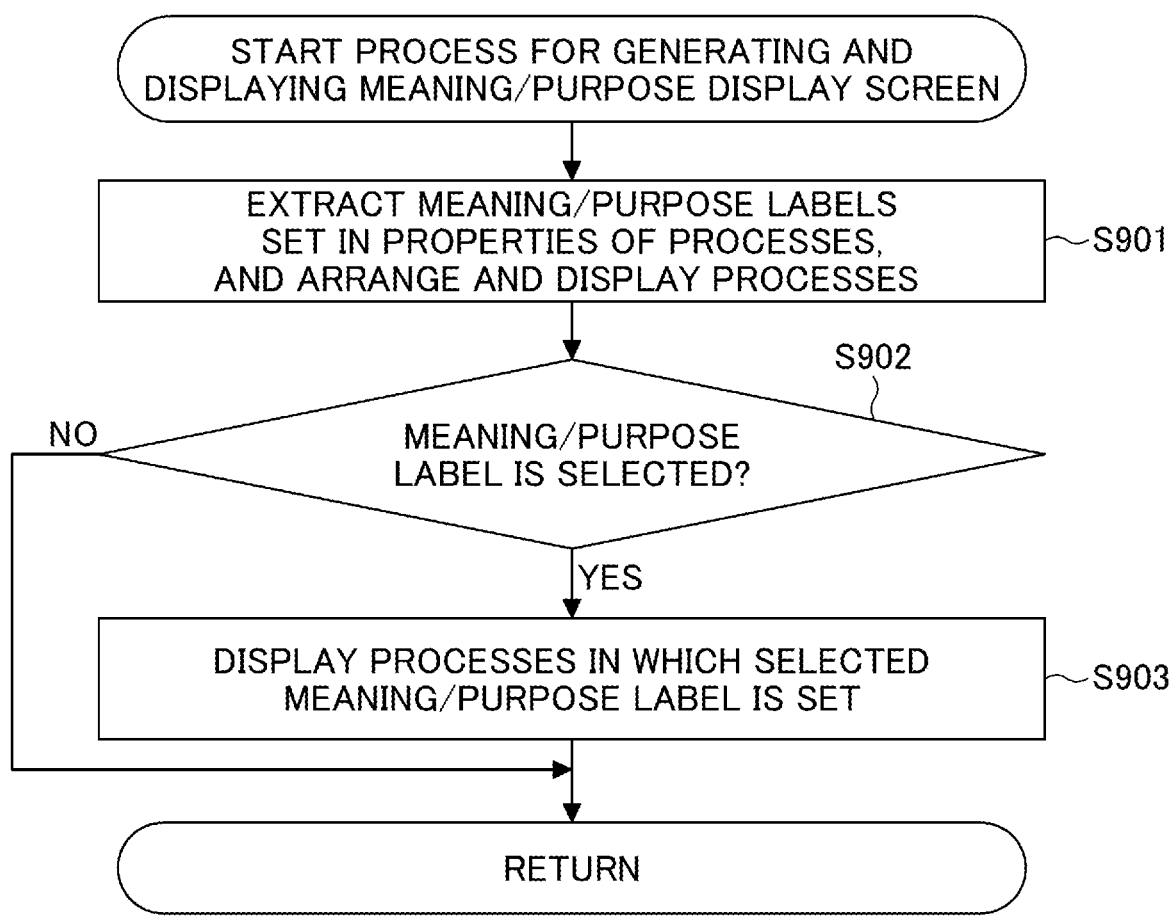
FIG. 9 is a flowchart illustrating a flow of a process for generating and displaying a meaning/purpose display screen.
Figure 10:
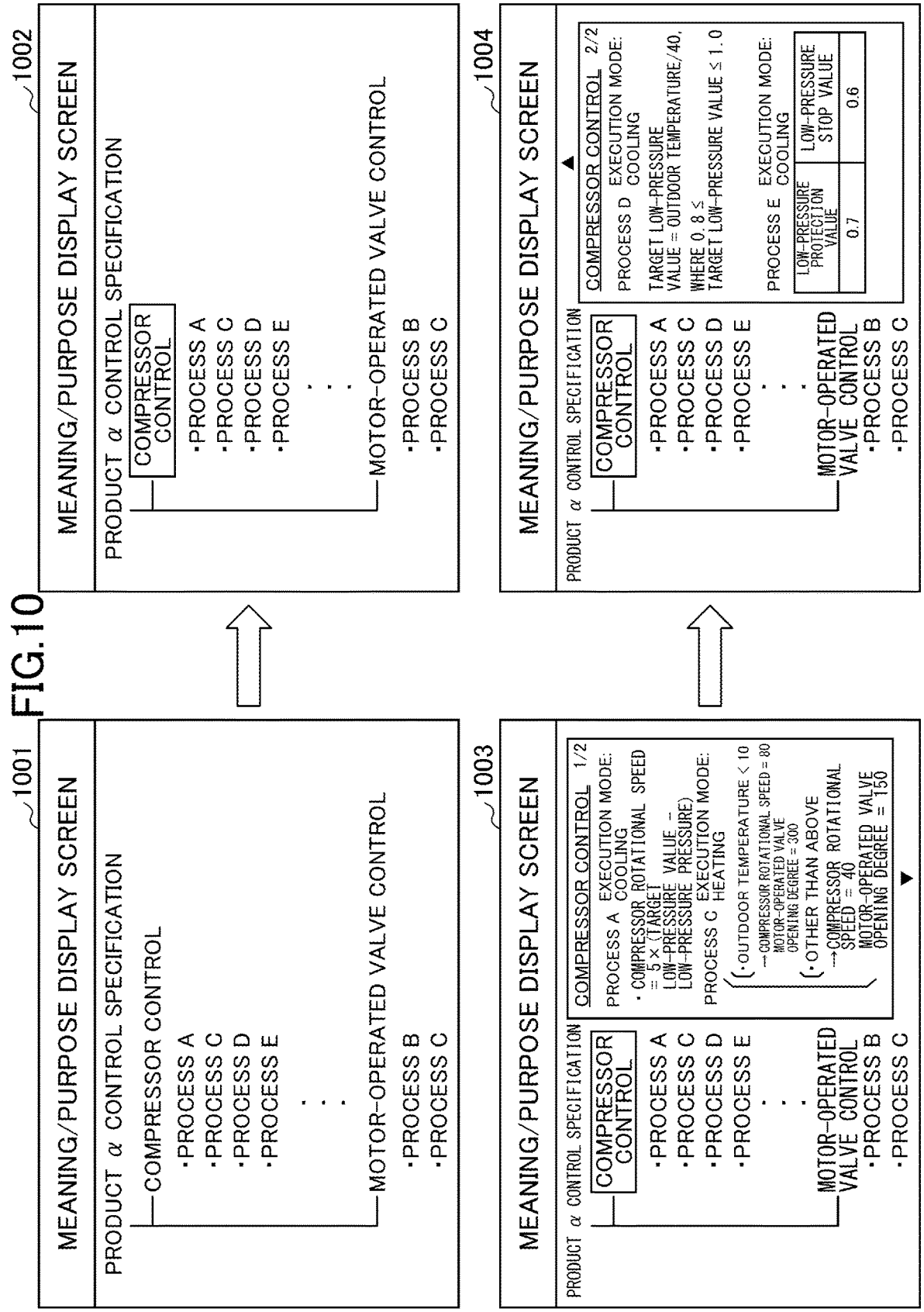
FIG. 10 is a diagram illustrating an example of meaning/purpose display screen transitions.

Next, details of the process for generating and displaying a meaning/purpose display screen will be described with reference to FIG. 9 and FIG. 10. FIG. 9 is a flowchart illustrating a flow of the process for generating and displaying a meaning/purpose display screen. FIG. 10 is a diagram illustrating an example of a meaning/purpose display screen. In the following, the process for generating and displaying a meaning/purpose display screen will be described in detail in accordance with the flowchart of FIG. 9 and with reference to FIG. 10.

In step S901, the control specification visualization unit 122 extracts the meaning/purpose labels set in the properties of the processes, and arranges and display the processes based on the extracted meaning/purpose labels.

In FIG. 10, a meaning/purpose display screen 1001 indicates that the meaning/purpose labels set in the properties of the processes 401, 402, 403, 404, 405, and the like are extracted by the control specification visualization unit 122. Further, the meaning/purpose display screen 1001 indicates that the extracted meaning/purpose labels are used as a table of contents to arrange and display the processes by meaning/purpose label.

The "compressor control" and the "motor-operated valve control" are set as meaning/purpose labels in the properties of the processes 401, 402, 403, 404, 405, and the like. Therefore, the control specification visualization unit 122 extracts these meaning/purpose labels and arranges the meaning/purpose labels as a table of contents on the meaning/purpose display screen 1001.

The control specification visualization unit 122 arranges the names ("process A", "process C", "process D", and "process E") of the processes 401, 403, 404, 405, in which "compressor control" is set as the meaning/purpose label, at positions corresponding to "compressor control".

Further, the control specification visualization unit 122 arranges the names ("process B" and "process C") of the processes 402 and 403, in which "motor-operated valve control" is set as the meaning/purpose label, at positions corresponding to "motor-operated valve control".

Accordingly, the meaning/purpose display screen 1001 allows the user 130 to readily recognize which meaning/purpose label is set in which process; and what process is executed under each meaning/purpose label.

In step S902, the control specification visualization unit 122 determines whether a specific meaning/purpose label is selected by the user 130 and an access instruction is input for a plurality of processes in which the specific meaning/purpose label is set. In step S902, if the control specification visualization unit 122 determines that a meaning/purpose label is selected by the user 130 and an access instruction is input (YES in step S902), the process proceeds to step S903.

In step S903, the control specification visualization unit 122 accesses the plurality of processes in which the selected meaning/purpose label is set in the properties, and displays processing contents of the plurality of processes.

In FIG. 10, a meaning/purpose display screen 1002 indicates that the meaning/purpose label "compressor control" is selected by the user 130 and the access instruction is input.

Further, in FIG. 10, meaning/purpose display screens 1003 and 1004 indicate that processing contents of the process 401 and the processes 403 to 405 ("process A" and "process C" to "process E"), in which the meaning/purpose label "compressor control" is set in the properties, are displayed.

Accordingly, the user 130 can use the meaning/purpose display screen to smoothly access processes in which a specific meaning/purpose label is set in properties.

Details of Process for Generating and Displaying Data Flow Display Screen

Figure 11:
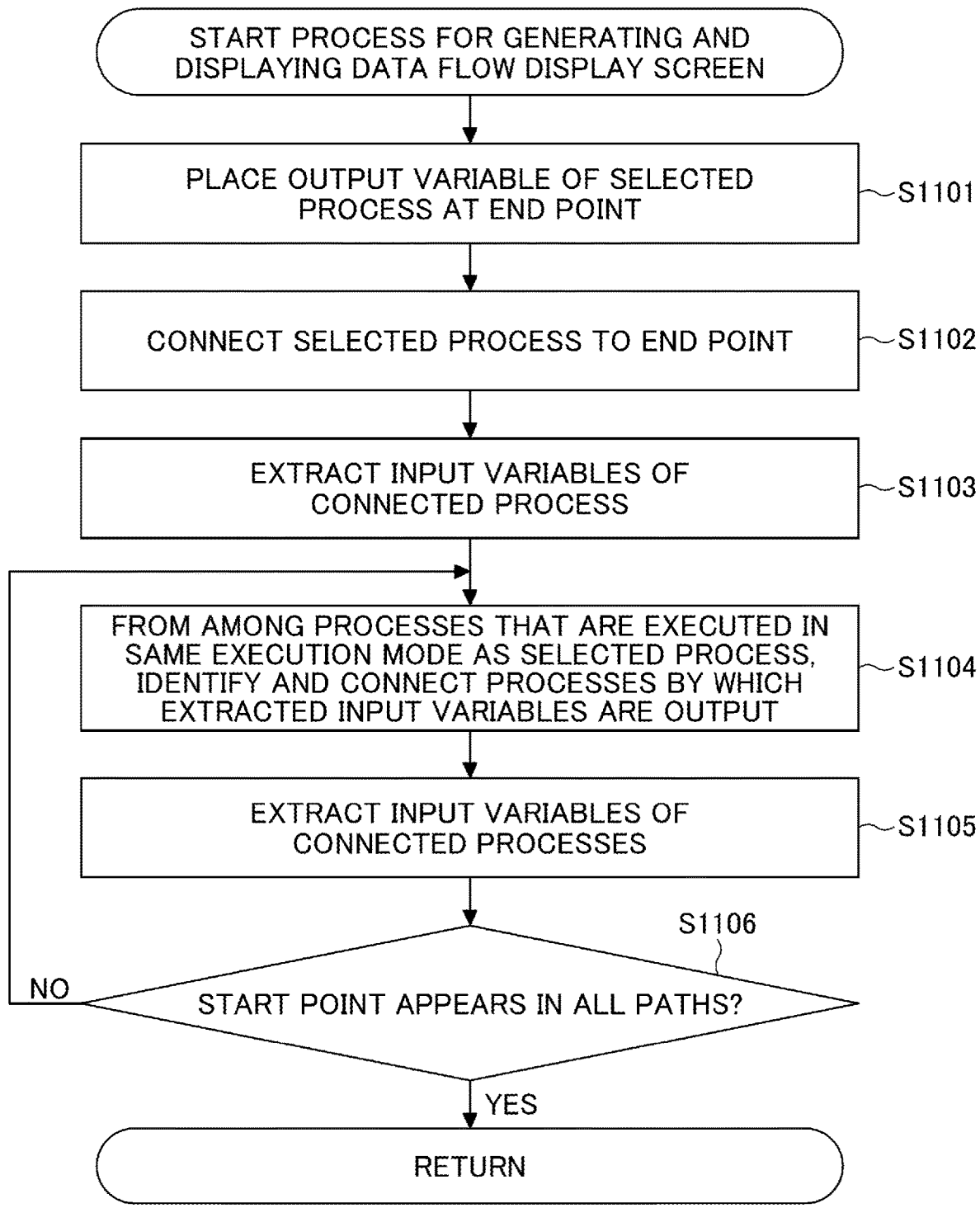
FIG. 11 is a flowchart illustrating a flow of a process for generating and displaying a data flow display screen.
Figure 12:
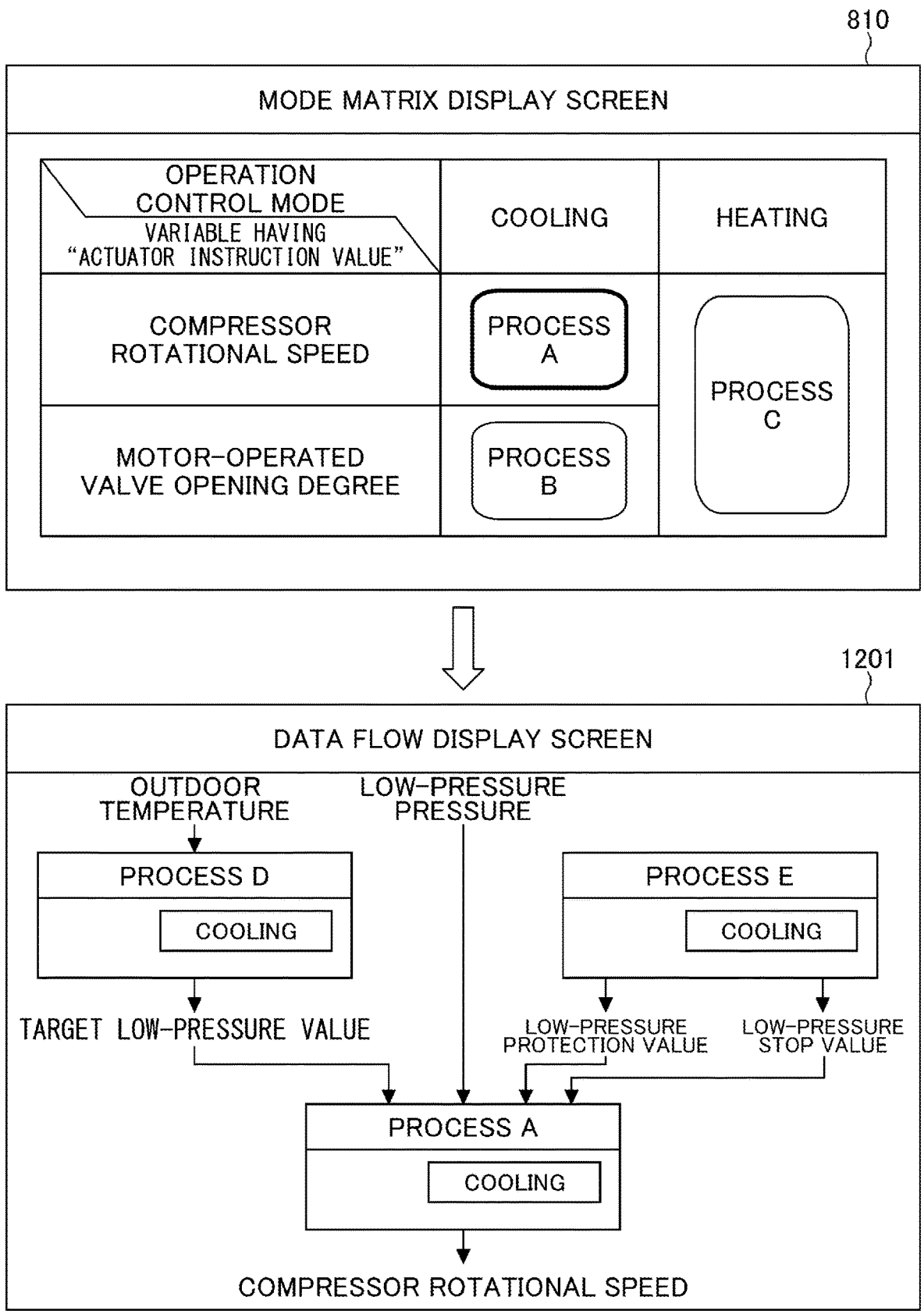
FIG. 12 is a diagram illustrating an example of a data flow display screen.

Next, details of the process for generating and displaying a data flow display screen will be described with reference to FIG. 11 and FIG. 12. FIG. 11 is a flowchart illustrating a flow of the process for generating and displaying a data flow display screen. FIG. 12 is a diagram illustrating an example of a data flow display screen. In the following, the process for generating and displaying a data flow display screen will be described in detail in accordance with the flowchart of FIG. 11 and with reference to FIG. 12. In this example, in response to the control specification visualization unit 122 determining that a data flow display instruction is received in step S604 of FIG. 6, the process for generating and displaying a data flow display screen is started.

Specifically, in response to the process 401 having the process name "process A" being selected on the mode matrix display screen 810 and a data flow display instruction being input as a visualization instruction, the control specification visualization unit 122 receives the data flow display instruction. In this case, the control specification visualization unit 122 starts the process for generating and displaying a data flow display screen, and displays a data flow display screen 1201 as illustrated in FIG. 12.

In step S1101, the control specification visualization unit 122 places an output variable of the process selected on the mode matrix display screen 810 at an end point.

Specifically, as illustrated in FIG. 12, the control specification visualization unit 122 analyzes processing contents of the process 401 having the process name "process A", extracts "compressor rotational speed" that is an output variable, and places the output variable at an end point.

In step S1102, the control specification visualization unit 122 connects the selected process to the end point.

Specifically, as illustrated in FIG. 12, the control specification visualization unit 122 connects the process 401 having the process name "process A" to the end point (compressor rotational speed).

In step S1103, the control specification visualization unit 122 extracts input variables of the connected process.

Specifically, as illustrated in FIG. 12, the control specification visualization unit 122 extracts "target low-pressure value", "low-pressure protection value", and "low-pressure stop value" as input variables of the process 401 having the process name "process A".

In step S1104, from among processes that are executed in the same execution mode as the selected process, the control specification visualization unit 122 identifies and connects processes by which the input variables extracted in step S1103 are output.

Specifically, as illustrated in FIG. 12, from among processes that are executed in the "cooling" mode, which is the execution mode of the process 401, the control specification visualization unit 122 identifies and connects processes by which "target low-pressure value", "low-pressure pressure", "low-pressure protection value", and "low-pressure stop value" are output.

In the example of FIG. 12, as a process that is executed in "cooling" mode and by which "target low-pressure value" is output, the process 404 having the process name "process D" is identified and connected. In addition, in example of FIG. 12, as a process that is executed in "cooling" mode and by which "low-pressure protection value" and "low-pressure stop value" are output, the process 405 having the process name "process E" is identified and connected.

In step S1105, the control specification visualization unit 122 extracts input variables of the connected processes. Specifically, as illustrated in FIG. 12, the control specification visualization unit 122 extracts, for example, "outdoor temperature" as an input variable of the process 404 having the process name "process D".

In step S1106, the control specification visualization unit 122 determines whether a start point appears in all paths. In step S1106, if the control specification visualization unit 122 determines that there is a path in which the start point does not appear (NO in step S1106), the process returns to step S1104. The control specification visualization unit 122 generates a data flow by repeating steps S1104 to S1106 so as to connect a plurality of processes by using input variables and output variables.

In step S1106, if the control specification visualization unit 122 determines that the start point appears in all paths (YES in step S1106), the process returns to step S610 of FIG. 6.

Accordingly, the user 130 can use the data flow display screen to visually recognize a plurality of processes arranged in the execution order determined based on input/output variables of the processes. As a result, the user 130 can grasp the execution order of the plurality of processes. Further, the user 130 can check the appropriateness of processing contents of each of the processes based on the execution order of the processes.

Figure 13:
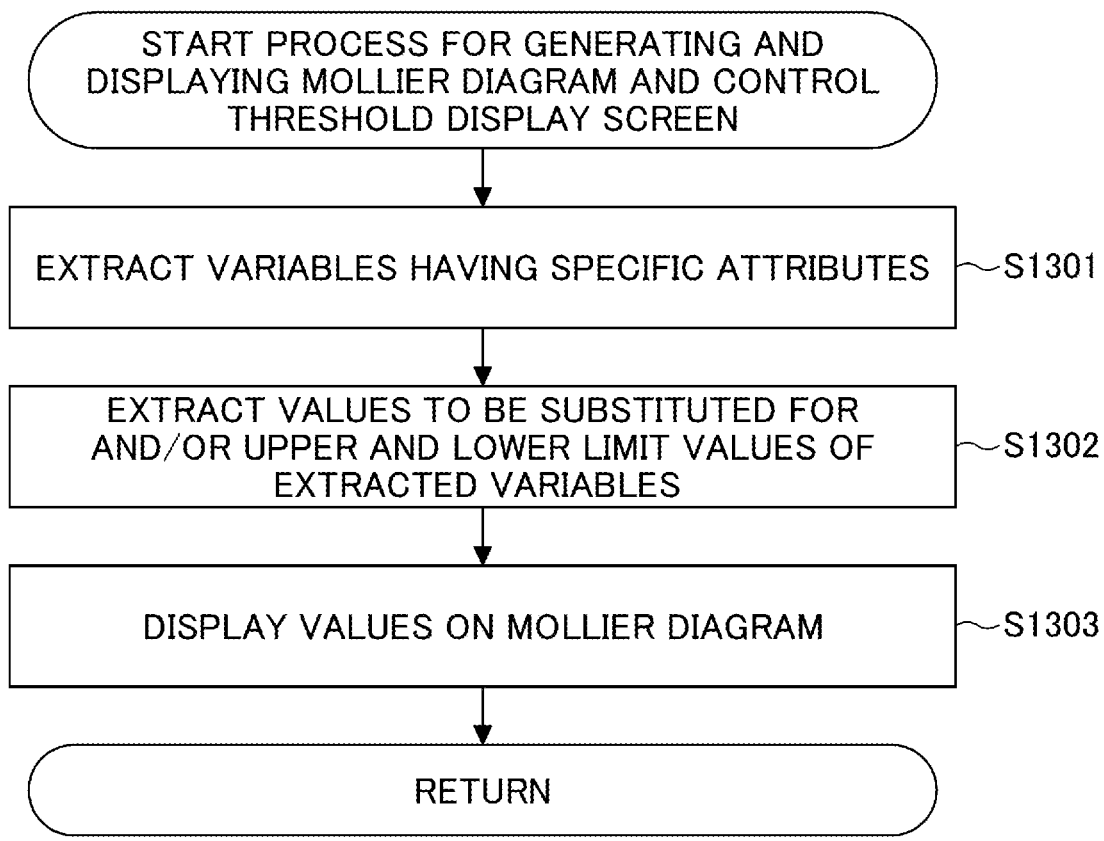
FIG. 13 is a flowchart illustrating a flow of a process for generating and displaying a Mollier diagram and control threshold display screen.
Figure 14:
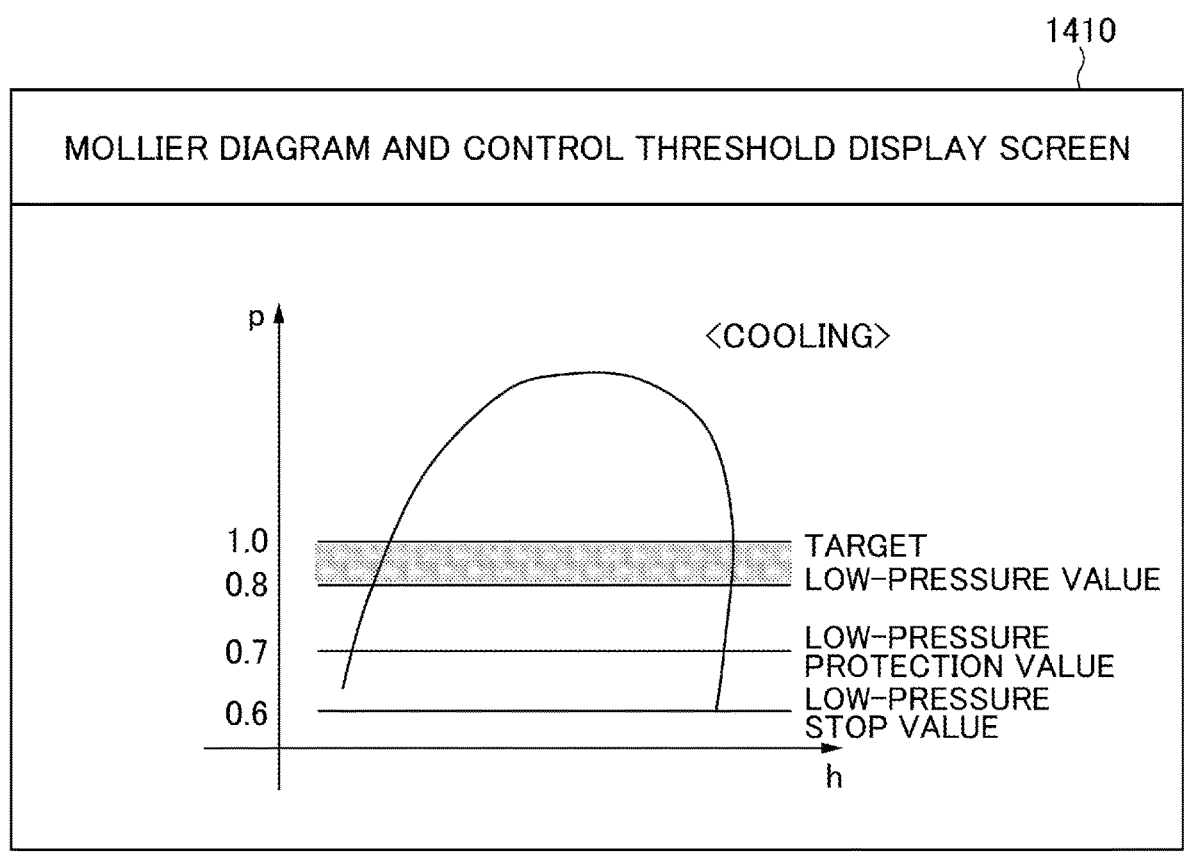
FIG. 14 is a diagram illustrating an example of a Mollier diagram and control threshold display screen.

Details of Process for Generating and Displaying Screen for Mollier Diagram and Control Threshold Display Screen Next, details of the process for generating and displaying a Mollier diagram and control threshold display screen will be described with reference to FIG. 13 and FIG. 14. FIG. 13 is a flowchart illustrating a flow of the process for generating and displaying a Mollier diagram and control threshold display screen. FIG. 14 is a diagram illustrating an example of a Mollier diagram and control threshold display screen. In the following, the process for generating and displaying a Mollier diagram and control threshold display screen will be described in detail in accordance with the flowchart of FIG. 13 and with reference to FIG. 14.

In step S1301, the control specification visualization unit 122 extracts variables having specific attributes specified by the user 130.

Specifically, the control specification visualization unit 122 extracts the variables "target low-pressure value", "low-pressure protection value", and "low-pressure stop value" having the attributes of "target control value", "protection threshold", and "stop threshold" (see FIG. 5) from the processes 404 and 405.

In step S1302, the control specification visualization unit 122 extracts values to be substituted for, and/or upper and lower limit values of, the extracted variables.

Specifically, the control specification visualization unit 122 extracts "0.8" and "1.0" from the process 404 as upper and lower limit values of "target low-pressure value". Further, the control specification visualization unit 122 extracts "0.7" from the process 405 as a value to be substituted for "low-pressure protection value". Further, the control specification visualization unit 122 extracts "0.6" from the process 405 to be substituted for "low-pressure stop value".

In step S1303, the control specification visualization unit 122 displays, on a Mollier diagram, the values to be substituted for, and/or the upper and lower limit values, of the extracted variables.

Specifically, the control specification visualization unit 122 displays the upper limit value "1.0" and the lower limit value "0.8" as the upper and lower limit values of the target low-pressure value on a Mollier diagram and control threshold display screen 1410. Further, the control specification visualization unit 122 displays the low-pressure protection value "0.7" on the Mollier diagram and control threshold display screen 1410. Further, the control specification visualization unit 122 displays the low-pressure stop value "0.6" on the Mollier diagram and control threshold display screen 1410.

As described, the control specification visualization unit 122 collectively displays, on a Mollier diagram, values written in different processes and/or upper and lower limit values, for example, values to be substituted for the variables having the attributes of "protection threshold" and "stop threshold" and the upper and lower limit values of the variable having the attribute of "target control value". Accordingly, the user 130 can check values (such as the target control value, the protection threshold, and the stop threshold) relating to a control operation range of the controlled devices. Further, the user 130 can check the appropriateness of processing contents of the processes from the relationship between (consistency of) the values (such as the target control value, the protection threshold, and the stop threshold) relating to the control operation range.

Summary

As is clear from the above description, in a control specification visualization method according to the first embodiment, the description unit performs an input process for inputting processing contents of a plurality of processes to be executed by controlled devices, and the control specification visualization unit performs a visualization process for visualizing a control specification by analyzing the processing contents of the plurality of processes based on at least any of operation control modes, a control operation range, input/output items, or meanings/purposes written in the processing contents.

Therefore, according to the first embodiment, the user can perform work for writing processing contents of a plurality of processes while grasping the control specification of all of the processes.

According to the first embodiment, a control specification visualization program and a control specification visualization method for improving work efficiency when designing a plurality of processes to be executed in controlled devices can be provided.

Second Embodiment

In the above descried first embodiment, the control specification visualization unit 122 collectively displays, on a Mollier diagram, values written in different processes and/or upper and lower limit values, for example, values to be substituted for, and/or upper and lower limit values of, variables having specific attributes.

However, a method for collectively displaying values on a Mollier diagram is not limited thereto, and a list of values relating to control operation range may be displayed.

Further, in the above-descried first embodiment, the control specification visualization unit 122 generates and displays the mode matrix display screen, the meaning/purpose display screen, the data flow display screen, and the Mollier diagram and control threshold display screen. However, the control specification visualization unit 122 may generate and display at least one of the display screens.

Although embodiments have been described above, it will be understood that various modifications may be made to the configurations and details thereof without departing from the spirit and scope of the claims.

This application is based on and claims priority to Japanese Patent Application No. 2020-062592, filed on Mar. 31, 2020, the entire contents of which are incorporated herein by reference.

DESCRIPTION OF THE REFERENCE NUMERALS

10 device system
110 design work support apparatus
120 design work support function
121 description unit
122 control specification visualization unit
401 to 405 process
800, 810 mode matrix display screen
1001 to 1004 meaning/purpose display screen
1201 data flow display screen
1410 Mollier diagram and control threshold display screen

The invention claimed is:

1. A non-transitory computer-readable recording medium storing a control specification visualization program for causing a computer to execute:
   an input process for inputting processing contents of a plurality of processes to be executed in controlled devices, wherein the processing contents of the plurality of processes are written by the user; and
   a visualization process for visualizing a control specification by analyzing the processing contents of the plurality of processes,
   wherein the visualization process visualizes the control specification by analyzing the processing contents of the plurality of processes based on at least any of operation control modes, a control operation range, input/output items, or meanings/purposes, the operation control modes, the control operation range, the input/output items, and the meanings/purposes being written in the processing contents of the plurality of processes,
   wherein the visualization process extracts various information based on the analyzing of the processing contents of the plurality of processes, and displays the extracted various information, and
   wherein the displayed various information includes information for each of the processes of the plurality of processes to be executed in the controlled devices.

2. The non-transitory computer-readable recording medium according to claim 1, wherein, when the visualization process analyzes the processing contents based on the operation control modes, the visualization process two-dimensionally arranges the operation control modes and variables having a specific attribute so as to visualize, for each of the operation control modes, processes by which the variables having the specific attribute are calculated, the operation control modes being selectable for each of the processes.

3. The non-transitory computer-readable recording medium according to claim 2, wherein, when a process, by which a variable having the specific attribute is calculated, is selected and an access instruction is input, the visualization process displays processing contents of the selected process.

4. The non-transitory computer-readable recording medium according to claim 1, wherein, when the visualization process analyzes the processing contents based on the control operation range, the visualization process visualizes the control operation range by arranging values relating to the control operation range on a Mollier diagram.

5. The non-transitory computer-readable recording medium according to claim 1, wherein, when the visualization process analyzes the processing contents based on the input/output items, the visualization process visualizes an execution order of the plurality of processes by arranging the plurality of processes in the execution order.

6. The non-transitory computer-readable recording medium according to claim 1, wherein, when the visualization process analyzes the processing contents based on the meanings/purposes, the visualization process classifies and displays the processes based on meaning/purpose labels so as to visualize a process for each of the meaning/purpose labels, each of the processes including the meaning/purpose label.

7. The non-transitory computer-readable recording medium according to claim 6, wherein, when a meaning/purpose label is selected and an access instruction is input, the visualization process displays processing contents of a process in which the selected meaning/purpose label is set.

8. A control specification visualization method comprising:
an input process for inputting processing contents of a plurality of processes to be executed in controlled devices, wherein the processing contents of the plurality of processes are written by the user; and
a visualization process for visualizing a control specification by analyzing the processing contents of the plurality of processes,
wherein the visualization process visualizes the control specification by analyzing the processing contents of the plurality of processes based on at least any of operation control modes, a control operation range, input/output items, or meanings/purposes, the operation control modes, the control operation range, the input/output items, and the meanings/purposes being written in the processing contents of the plurality of processes,
wherein the visualization process extracts various information based on the analyzing of the processing contents of the plurality of processes, and displays the extracted various information, and
wherein the displayed various information includes information for each of the processes of the plurality of processes to be executed in the controlled devices.

9. The non-transitory computer-readable recording medium according to claim 1, wherein the input/output items comprise variables, and
wherein the processes to be executed in the controlled devices are executed based on the variables of the input/output items.

* * * * *